Patented Aug. 28, 1945

2,383,580

UNITED STATES PATENT OFFICE 2,383,580

TREATING FATTY MATERIALS

Clarence Joseph Arrowsmith, New York, N. Y., and John Ross, Ramsey, N. J., assignors to Colgate-Palmolive-Peet Company, Jersey City, N. J., a corporation of Delaware No Drawing. Application March 20, 1943, Serial No. 479,882

15 Claims. (Cl. 260—410.9)

The present invention relates to a process for removing desired reaction products from alcoholysis reaction mixtures and, more particularly, to a novel process for separately recovering glycerine and alkyl esters in a substantially pure state from said mixtures.

A fat or fatty oil can be reacted with an alcohol in the presence of an alcoholysis catalyst to produce glycerine and alcohol esters of fatty acids. The reaction mixture may contain triglycerides, mono- and di-glycerides, monohydric alcohol esters, glycerine and excess alcohol, the proportions of the various ingredients varying with the extent of the reaction. According to the prior art, such a reaction mixture containing mono- and/or di-glycerides was believed not to be distillable without undergoing a reversion to glycerine and triglycerides. Moreover, the prior art taught that the heating of an alcoholysis reaction mixture comprising alkyl esters and glycerine, with or without the presence of mono- and di-glycerides, would result in reversion to glycerides and alcohol, especially under the continuous removal of the alcohol by volatilization.

Since, by the processes employed by the prior art, glycerine was not readily separated from the fatty esters, separate processing of two layers was required. The difficulties of the separation method were increased when using ethyl or other alcohols higher than methyl for the alcoholysis, as a separation of glycerine from esters was frequently not immediately obtainable in such cases. Excess alcohol and catalyst were washed out with water to effect a separation, such washing operation being a tedious and uneconomic procedure. Moreover, in washing with water, the resulting dilution of the glycerine required a concentration step, and the recovered unreacted alcohol had to be dehydrated before reuse.

It is an object of the present invention to provide an improved process for treating alcoholysis reaction mixtures whereby large yields of fatty acid monohydric alcohol esters and glycerine are obtained.

It is another object of the invention to provide a novel and direct method for purifying in a single distillation the glycerine and alkyl esters resulting from the reaction of fatty glycerides with an alcohol.

It is also an object of this invention to provide a new process for recovering excess alcohol substantially anhydrous from an alcoholysis reaction mixture without substantial reversion of the fatty acid ester-glycerine formation.

Other objects and advantages of the invention will be apparent from the following description.

According to the present invention, an alcoholysis reaction mixture is formed by reacting a fatty acid ester of a higher alcohol (preferably a glyceride) with an alcohol in the presence of an alcoholysis catalyst. The catalyst is then inhibited, preferably by neutralization or partial neutralization of the mixture, any unreacted alcohol is removed, and the alkyl esters and higher alcohol (say, glycerine) are recovered in highly purified form. The alkyl esters and the glycerine are preferably recovered by distilling them together from the reaction body, the distillate readily separating into two layers.

Although the mechanism of alcoholysis of fatty glycerides is not completely understood as yet, research investigations now indicate that, when using alkaline catalysts, the extent of alcoholysis of fatty glycerides is a function of the competition represented by the rate of radical interchange between the glyceride and the alcohol and the rate of saponification by free alkali of the monohydric alcohol esters formed and of the glycerides present (whether triglycerides or partially reacted mono- and/or di-glycerides). It is therefore advantageous to provide a low rate of soap formation as compared with the rate of glyceride-alcohol exchange, and it has now been discovered that the soap content of the reaction mixture increases with an increase in the amount of alkaline catalyst employed, with an increase in temperature, with an increase in the length of reaction time, and with an increase in the water content. It has also now been discovered that an increased excess of alcohol permits a reduction in the total amount of alkaline catalyst needed to produce a maximum yield of esters.

The glyceride-alcohol reaction may be carried out in the presence of either an alkaline or an acid alcoholysis catalyst, and it has now been found that, if no trace of an alcoholysis catalyst is present or if any catalyst present is inhibited, mixtures of glycerine with monohydric alcohol esters of fatty acids can be distilled together without interaction. Similarly, in the absence of an alcoholysis catalyst or in the presence of an inhibitor thereof, monoglycerides, either alone or mixed with either or both of glycerine and fatty esters, may be distilled without chemical reaction. Diglycerides are also unchanged under the same conditions.

In forming the reaction mixture for alcoholysis, a fatty glyceride is contacted with an alcohol, preferably in large excess, in the presence of a small amount of an alcoholysis catalyst. The mixture may be kept at room temperature or may be heated during a period of a few minutes to obtain rapid alcoholysis. The reaction may be brought to the degree of completion desired in a single contacting of the materials, or, as disclosed by Joseph Henry Percy in United States patent application Ser. No. 462,369 (filed October 17, 1942), the glycerides may be partially esterified with the alcohol in a first treatment to form a pool of partially reacted material containing monoglycerides and diglycerides, so that the reaction mixture is substantially homogeneous. Additional reactants, such as alcohol and/or alcoholysis catalyst either alone or with the fatty oil, can be added to this homogeneous mixture without immediately affecting the homogeneity, and the reaction may then be brought toward completion.

When the reaction has reached the desired point, whether in a single contacting or in a series of steps, the catalyst is destroyed or otherwise inhibited, preferably by neutralizing the mixture or by partially neutralizing so as to form a mixture containing both free fatty acid and a fatty acid soap. The entire reaction mixture is then directly distilled first to remove the excess alcohol, and then, preferably under vacuum, to obtain a distillate comprising alkyl esters and glycerine, with or without the presence of fatty acids and/or partially reacted glycerides as determined by the operating conditions. This distillate readily separates into two phases, forming a lower glycerine layer and an upper layer comprising alkyl esters. The distillation residue may comprise soap and/or partially reacted glycerides and/or fatty acids, depending upon the operating conditions.

According to an alternative procedure, an acid catalyst may be destroyed or otherwise inhibited, preferably by neutralization or partial neutralization, after removal of the excess alcohol. In this modification, a proportion of the products may revert at the volatilization temperature of the alcohol, say, at about 110° C. to about 140° C., but this proportion is relatively small.

When removing alcohol, after modification of the catalyst, it may be desired to stop the distillation when substantially all of the excess alcohol has been removed, and then the glycerine and ester layers may be separated without (or before) distilling them. Since the distillation residue contains substantially no alcohol as a common solvent for glycerine and alkyl esters, a separation usually results. However, the codistillation of glycerine with fatty esters permits the use of a single still for the two separate products of the reaction and at the same time reduces the temperature of distillation for both, since the azeotropic codistillation which is obtained gives a lower boiling-point for the mixture than for either of the separate components thereof. In this way, the consumption of heat is less, and products are obtained which are less degraded by high temperature exposure.

In another modification, the reaction mixture after neutralization (or other inhibition of the catalyst) can be settled to separate a glycerine layer, which is withdrawn. The upper layer containing some glycerine, excess alcohol and alkyl esters, as well as fatty acids and/or mono- and/or diglycerides if present, is then distilled, first at atmospheric pressure to remove the alcohol and then under vacuum to give a distillate which separates on standing into a glycerine layer and a layer containing alkyl esters, together with partially reacted glycerides if present. As in the modification described supra, the distillation of the upper layer can be stopped when substantially all unreacted alcohol is removed thereby, whereafter another glycerine layer can be withdrawn. Since substantially all of the glycerine held in the upper layer is removed by this procedure, the resulting upper layer can be used without further distillation.

The fatty material treated by the process may be any of the fats or fatty oils suitable for employment by the soapmaking art in any of the processes heretofore known or any other fatty acid ester of a higher alcohol, such as glycerol or other polyhydric alcohols or long-chain (say, about twelve to about twenty carbons) monohydric alcohols, or mixtures of these esters, especially glycerides of fatty acids having about eight to about twenty-six, and preferably about twelve to about twenty, carbon atoms per molecule. These esters include coconut oil, palm oil, olive oil, cottonseed oil, soya bean oil, corn oil, tung oil, wool fat, tallow, whale and fish oils, etc. Although it is preferred to employ a refined oil containing substantially no moisture, small amounts of water can be tolerated when carrying out the reaction with the lower alcohols, such as methyl or ethyl alcohol and especially methanol, as disclosed by Gerald Inman Keim and John Ross in United States patent application Serial No. 478,008 (filed March 4, 1943). Similarly, where acid alcoholysis is employed or where, in alkaline alcoholysis, acidification of the reaction mixture for destruction of the alkaline catalyst is contemplated, free fatty acid may be present in the glyceride in the proportion of 10 to 20% or even higher.

In carrying out the alcoholysis according to this invention, short-chain aliphatic monohydric alcohols, including aryl-substituted aliphatic alcohols, are preferably employed, particularly the saturated, primary alcohols, especially alcohols having a boiling-point in the presence of excess water of lower than 100° C. at atmospheric pressure and, more particularly, the lower alcohols having one to about six carbon atoms per molecule. Thus, alcohols satisfactory for use in forming esters with the fatty acid components of the glycerides treated include such low molecule weight alcohols as methyl alcohol, ethyl alcohol, propyl alcohol, isopropyl alcohol, n-butyl alcohol, isobutyl alcohol, secondary butyl alcohol, tertiary butyl alcohol, the amyl alcohols, benzyl alcohol, etc. While any proportions of fatty material and alcohol may be used, it is preferred to employ an amount of alcohol at least about 50% in excess of the calculated theoretical amount necessary for alcoholysis of the particular glycerides treated, and particularly satisfactory results have been obtained when using an excess of at least three to five times the stoichiometric amount required.

In selecting an alcoholysis catalyst, an alkaline or an acidic catalyst may be employed. Among those which have been found suitable for use in the present process are sodium hydroxide, sodium methylate, sodium carbonate, barium oxide, lime, tetramethyl ammonium hydroxide, hydrochloric acid, trichloracetic acid, phosphoric acid, sulphuric acid, aluminum chloride, boron fluoride, glycerine monoacid sulphate, alkyl sulphuric acids, organic sulphonic acids, etc. While it is possible to obtain good yields with proportions of alkaline catalyst up to about 0.30 mol per equivalent of fatty glycerides and higher, it is preferred to use large excesses of alcohol and to introduce relatively small amounts of catalyst, say of the order of about 0.03 mol to about 0.10 mol per equivalent of glycerides in order to reduce the amount of soap formed. With acidic catalysts, similar proportions are generally employed. A convenient way of introducing the catalyst into the reaction mixture is in admixture with and, where practical, advantageously in solution in the alcohol employed. When the glyceride treated contains free fatty acid, sufficient alkaline catalyst may be added to provide an excess of alkali above that destroyed by the free fatty acid present. However, acid catalysts are particularly appropriate for use with oils containing a large proportion of free fatty acids, as the acids are esterified during the process.

In carrying out the alcoholysis according to this invention, the temperature may be regulated as desired. In general, when employing an alkaline catalyst, it is preferred to contact the fatty glyceride, alcohol and catalyst at about room temperature, particularly if small amounts of water are present, in order to avoid the possibility of excessive local saponification of the resulting esters. Such saponification removes the catalyst from the reaction body before the reactants have been thoroughly mixed and allowed to react. When the reactants are substantially anhydrous, they may be separately preheated to a desired reaction temperature and thoroughly mixed directly in a reaction coil or other vessel, whereby the reaction can be completed in an extremely short reaction time.

With either acid or alkaline catalyst, the reaction temperature may vary from about 40° C. to about 160° C. or higher, but below the temperature of substantial degradation of the reactants. Where an alkaline catalyst is employed, the temperature of reaction may also be below the temperature of substantially complete removal of the alkaline catalyst by saponification of the resulting esters. In alcoholysis with either methanol or ethanol, it is preferred to maintain temperatures of about 80° C. to about 160° C., and temperatures of about 90° C. to about 130 C. have been found to give particularly satisfactory results. In general, the operation may be carried out as a batch, intermittent or continuous process, and at reduced pressures, at atmospheric pressure or at superatmospheric pressures, but it is preferred to provide a pressure in the reaction vessel or coil sufficient to maintain a liquid alcohol phase.

Upon completion of the reaction, the catalyst is destroyed or otherwise inhibited. A method for inhibiting the catalyst, whether alkaline or acid, is to neutralize the reaction mixture or to bring it to a pH of about 3 to about 10, and preferably to a pH of about 5 to about 7, as indicated by the reading on the dial of a standard electronic pH meter using glass electrodes. The apparent pH of the mixture may be determined by indicators, a glass electrode or other suitable means. In neutralizing a reaction mixture resulting from the alkaline alcoholysis of fatty glycerides, the neutralization or change in pH is preferably carried out by the addition of an acid stronger than the fatty acids of the glycerides. A higher fatty acid or similarly weak acid may also be used in an amount in excess of that required for neutralizing any free alkali present; the addition of a fatty acid causes the formation of a soap with the free alkali present, and any other acid as weak as a fatty acid, while neutralizing the free alkali still in the mixture, is not strong enough to split the soap formed during the reaction by saponification of the fatty esters. In either case, the excess acid provided acts as an inhibitor of the catalytic effect of the soap present. "Neutral" soap (so-called) has otherwise been found to act as a catalyst for the glyceride-alcohol reaction at temperatures as low as about 140° C. and especially at temperatures above about 160° C.

Among the acids stronger than the fatty acids of the glycerides which have proved satisfactory for use in the present process are glacial acetic acid, hydrochloric acid, sulphuric acid, phosphoric acid, boric acid, sulphur dioxide, benzene sulphonic acid, etc. It is preferred to employ a substantially non-aqueous acid to give an anhydrous alcohol suitable for reuse in the process without dehydration, as otherwise the excess alcohol recovered from the subsequent distillation step may contain a proportion of water. Where an aqueous acid is used, the amount of water introduced with the acid during acidification (that is, the concentration of the acid) is controlled so that the proportion of water in the recovered alcohol is relatively small.

When the reaction is carried out in the presence of an acid alcoholysis catalyst, the catalyst is inhibited upon completion of the reaction by introducing a material of an alkaline nature in strength and amount sufficient to bring the mixture to the desired pH but insufficient to leave any free alkali in the reaction mixture. Among the alkaline materials satisfactory for use in this process are caustic soda, soda ash, soap, sodium tetraborate, sodium acetate and the like, and said materials are preferably added in substantially anhydrous condition. When employing a strong alkali, such as sodium hydroxide, an amount no more than sufficient to neutralize all of the acid catalyst is added; when using a relatively weakly alkaline material, such as the salts described, it is preferred to introduce a slight excess thereof. Thus, for example, the addition of a small excess of soap inhibits the acid catalyst by forming fatty acids, with a little soap still present in the mixture. In this manner, whether the reaction is catalyzed by an acid or an alkaline catalyst, the reaction mixture is substantially the same after inhibition of the catalyst.

After eliminating the influence of the catalyst, the excess alcohol is preferably removed by distillation, heating the reaction mixture to a temperature sufficient to volatilize the alcohol but below the temperature of substantial decomposition or degradation of the products. It is preferred to distill the mixture at atmospheric pressure, although reduced pressures or superatmospheric pressures may also be used. In general, with coconut oil and oils having a mixture of glycerides of like molecular weight, temperatures below about 160° C. to about 200° C. give satisfactory results, and, with most glycerides, a temperature of about 110° C. to about 140° C. has been found to provide rapid removal of the lower alcohols.

After removal of the alcohol, the product is subjected to reduced pressures, say of the order of about 1 mm. to about 10 mm. of mercury absolute (although somewhat higher pressures can be employed), and is rapidly or flash distilled. The distillate may be fractionally condensed when there is a sufficiently wide difference in boiling-points between the glycerine and the particular esters formed or may be condensed jointly, whereupon it readily separates into two layers as aforesaid. The lower glycerine layer is withdrawn as a substantially pure, water-white and anhydrous liquid, and the upper layer containing alkyl esters, and in some cases incompletely reacted glycerides, is also removed as substantially colorless esters. This upper layer may be treated in any of several ways, as has been pointed out in the Percy application Serial No. 462,369.

The following examples illustrate this invention, but it is not limited thereby.

Example I

About 215 parts by weight per minute of coconut oil are thoroughly mixed with 160 parts per minute of methyl alcohol and 1.6 parts per minute of sodium hydroxide during a period of some thirty seconds, the reactants being at 25° C. throughout the mixing. The mixture is run into a reaction coil having a holding time of approximately thirty seconds, and the temperature of the reactants is rapidly raised therein to about 130° C. Sufficient pressure is maintained within the coil to keep the methyl alcohol in the liquid state. The effluent from the coil passes, still under pressure, into a neutralizing chamber where an alcoholic solution of glacial acetic acid at a rate of flow sufficient to give a pH of about 6 is thoroughly contacted with the reaction mixture. The mixture, thus substantially neutralized, is run into a preheater where its temperature is raised to about 145° C. The heated material is flashed into a vaporization chamber at atmospheric pressure and then into a second chamber under a pressure of 100 mm. of mercury absolute. The excess alcohol is thereby volatilized and is withdrawn substantially anhydrous, whereby it can be reused in the process without dehydration. The remaining material passes to a vacuum still, where it is distilled under an absolute pressure of about 1 mm. of mercury. The distillate runs into a separation vessel, where it settles into two layers. The lower layer comprising glycerine is withdrawn, and the upper layer containing the methyl esters of coconut oil fatty acids overflows near the top of the separation vessel. Approximately 97.0% of the calculated theoretical yield is obtained.

Example II

About 295 pounds per minute of dry, refined sesame oil are run into a mixing vessel or contactor. Solid, anhydrous sodium hydroxide is dissolved in anhydrous methanol in the proportion of about 1 part by weight of sodium hydroxide to 40 parts of methanol, and the alcoholic solution is run into the contactor at the rate of 65.6 pounds per minute, a rate which is approximately twice that theoretically necessary for alcoholysis of the sesame oil. The contactor is furnished with stirring means and has an overflow outlet located at a point which allows only five minutes' run of materials to be contained in the contactor. The mixture, only partially reacted in this time and containing monoglycerides and diglycerides, passes from the outlet into a time coil or reactor of such dimensions that it takes about twenty-five minutes for the material to pass therethrough. During this period, the reaction proceeds to a point where two phases are present, and the mixture is then run into an acidification tank, where 2% sulphuric acid is added until a methyl red end point is reached; at this point, the pH is about 5. The acidified mixture is then run into a settling tank, where it is allowed to separate into two layers.

The lower glycerine layer is substantially continuously withdrawn at the bottom of the settling tank, and the upper layer overflows into a conduit through which it passes to a still. The excess alcohol is removed by distillation, and the bottoms from the still are run into a second settling tank, where a further amount of glycerine is settled out and withdrawn. The overflow from the second settling tank is divided into two portions. A first portion, substantially free of glycerine, is used without further distillation. The second portion is run into a vacuum distillation apparatus, where it is distilled at an absolute pressure of about 15 mm. of mercury. The methyl esters are topped from the still, and the bottoms or residue containing unreacted and partially reacted oil are continuously run back into the mixing vessel or contactor for reworking along with fresh oil.

Example III

About 215 parts by weight of coconut oil per minute are run into a contactor with 94 parts per minute of ethyl alcohol containing 2% of sodium hydroxide. The contactor is of such dimensions that approximately ten minutes' run of material is contained therein, and the overflow is connected with a reactor wherein the materials are turbulently agitated for some thirty minutes. The effluent from the reactor passes into a mixer, and gaseous sulphur dioxide is introduced therein at a rate sufficient to neutralize the caustic and soap present. The acidified mass separates into two phases and flows to a settling tank, from which a lower glycerine layer is withdrawn at the bottom. The overflow from the tank is run into a still operated at atmospheric pressure. Excess ethyl alcohol is vaporized and removed, and the bottoms pass to a vacuum distillation apparatus. The ethyl esters and any remaining glycerine are topped off and separated in a second settling tank, and the distillation residue is run back into the contactor for reprocessing along with fresh coconut oil.

Example IV

About 285 parts by weight of cottonseed oil are mixed with 184 parts of ethyl alcohol and 1 part of concentrated sulphuric acid. The mixture is refluxed with stirring at the boiling-point of the ethanol for approximately an hour and is then substantially neutralized with sodium acetate. Excess alcohol is volatilized off, and the distillation is continued under about 10 mm. absolute pressure. The distillate separates readily into two layers, a lower glycerine layer and an upper layer comprising the ethyl esters of cottonseed oil fatty acids.

Example V

A mixture of 143.4 grams of tallow containing less than 1% of moisture and about 5% of the free fatty acids of tallow together with 80 grams of methanol (an excess of about 400%) is heated with 1 gram of sodium hydroxide to the reflux temperature of the methyl alcohol. The refluxing is continued for thirty minutes, and the reaction mixture is then neutralized to a pH of approximately 7.0 with about 15 cc. of glacial acetic acid. The neutralized mixture is heated over a steam bath to remove the excess methyl alcohol, and the mixture is then distilled under a reduced pressure equivalent to 10 mm. of mercury absolute. The distillate is allowed to stand, and a glycerine layer separates out and is withdrawn.

A yield of distillate equivalent to about 96% of the calculated theoretical yield is obtained.

Example VI

A mixture of 86 grams of tallow and 48 grams of methyl alcohol is heated with 0.65 gram of sodium hydroxide to the refluxing temperature of the alcohol for a period of a half hour. About 3.1 grams of stearic acid is added to the reaction mixture to neutralize the catalyst, and excess alcohol is removed by heating on a steam bath. The entire residue is then distilled together at a pressure of about 10 mm. of mercury absolute. The distillate readily separates into an upper layer containing methyl esters of tallow and a lower glycerine layer, and the distillate yield is more than 99% of the calculated theoretical yield.

Example VI

A mixture of about 860 grams of tallow of a grade similar to that in Example V and 480 grams of anhydrous methanol is heated with 6.5 grams of anhydrous sodium hydroxide to the refluxing temperature of the methanol (i. e., about 64° C. to about 66° C.) for a period of approximately thirty minutes. The reaction mixture is then allowed to cool and to stand for three days. About 1 gram of stearic acid is then added to neutralize the sodium hydroxide which has not been used up in saponifying the methyl esters. Excess methyl alcohol is vaporized off, and the remainder of the reaction mixture is distilled. The distillate separates into two layers containing, respectively, esters and glycerine.

Example VIII

About 100 parts by weight per minute of coconut oil are mixed with 72 parts per minute of methanol and 1 part per minute of concentrated sulphuric acid. The mixture is run into a reaction coil having a holding time of some forty-five minutes and is there heated to a temperature of approximately 135° C. under sufficient pressure to maintain a liquid methanol phase. The effluent passes through a mixing coil where a stream of alcoholic sodium hydroxide is added at a rate just insufficient to neutralize the reaction mixture. The neutralization is then completed by introducing a stream of an alcoholic solution of a sodium coconut oil soap at a sufficient rate to accomplish the neutralization. The neutralized mixture flows into a column still, where excess alcohol therein is topped off, and the bottoms pass over steam coils at the bottom of the still which serve as a reboiler. The temperature of the residue is raised therein to about 140° C., and it is flashed into a vaporization chamber maintained at about 135° C. and under a reduced pressure of 10 mm. of mercury absolute. The distillate is collected and separates into a lower glycerine layer and an upper layer containing the methyl esters.

The ester fractions obtained by alcoholysis of natural fatty acid esters according to the present invention, with or without washing and/or subsequent purification, can be employed in many chemical processes and products, as in the paint, perfumery, lubricating oils, medicinals and other fields. They may be used for chemical reductions and in many chemical syntheses, and one of their greatest outlets for volume consumption is in the soap-making industry.

Although the present invention has been described with reference to particular embodiments and examples, it will be apparent to those skilled in the art that variations and modifications of this invention can be made and that equivalents can be substituted therefor without departing from the principles and true spirit of the invention. Thus, for example, the invention is also applicable to the preparation of fatty acid mono- and/or di-glycerides and/or to the purification of commercial monoglycerides and diglycerides. Accordingly, in mixtures containing such partially reacted glycerides, including mixtures resulting from the reaction of a triglyceride and glycerine in any desired proportion, the catalyst can be destroyed by adjusting the apparent pH of the mixture to between 3 and 10, and preferably by providing a pH of about 5 to about 7. This adjustment is followed by distillation (e. g., vacuum or molecular distillation), the boiling-points of the monoglycerides of the moderately high fatty acids (e. g., the coconut oil fatty acids) lying between about 150° C. and about 200° C. at approximately 1 mm. of mercury absolute pressure.

We claim:

1. The process which comprises reacting a fatty glyceride with a low molecular weight monohydric alcohol in the presence of an alcoholysis catalyst to provide a liquid body containing glycerine and esters of fatty acids from said glyceride with said alcohol, removing the influence of the catalyst, volatilizing unreacted alcohol from said liquid body, and thereafter separating the said esters from the glycerine.

2. A process for treating fatty glycerides which comprises reacting a fatty glyceride with a saturated, aliphatic, monohydric alcohol having one to about six carbon atoms per molecule in the presence of an alcoholysis catalyst to provide a liquid body containing alkyl esters, glycerine and unreacted alcohol; bringing the liquid body to a pH of about 3 to about 10; volatilizing unreacted alcohol from said liquid body; and thereafter separating the alkyl esters from the glycerine.

3. A process for treating fatty glycerides which comprises reacting a fatty glyceride with a saturated, aliphatic, monohydric alcohol having one to about six carbon atoms per molecule in the presence of an alkaline alcoholysis catalyst to provide a liquid body containing alkyl esters, glycerine and unreacted alcohol; adding sufficient acidic material to the liquid body to obtain a pH of about 5 to about 7; volatilizing unreacted alcoholic from said liquid body; settling the remainder of said liquid body into an upper layer containing alkyl esters and a lower layer containing glycerine; and separating the upper layer from the lower layer.

4. A process for treating fatty glycerides which comprises reacting a fatty glyceride with a saturated, aliphatic, monohydric alcohol having one to about six carbon atoms per molecule in the presence of an alkaline alcoholysis catalyst to provide a liquid body containing alkyl esters, glycerine and unreacted alcohol; substantially neutralizing the said liquid body with an acid stronger than the fatty acid of the glyceride; volatilizing unreacted alcohol from said liquid body; and distilling the remainder of the liquid body under reduced pressure to obtain a distillate comprising alkyl esters and glycerine, whereby said esters and glycerine can be readily separated.

5. A process for treating fatty glycerides which comprises reacting a fatty glyceride with a saturated, straight-chain, monohydric alcohol having one to about six carbon atoms per molecule in the presence of an alkaline alcoholysis catalyst to provide a liquid body containing alkyl esters, glycerine and unreacted alcohol; adding a fatty acid to said liquid body, said fatty acid being in excess of the amount required to neutralize free alkali present therein; volatilizing unreacted alcohol from said liquid body; and distilling the remainder of said liquid body under reduced pressure to obtain a distillate comprising alkyl esters and glycerine, whereby said esters and glycerine can be readily separated.

6. A process for treating fatty glycerides which comprises reacting a fatty glyceride with methyl alcohol in the presence of an alkaline alcoholysis catalyst to provide a liquid body containing methyl esters, glycerine and unreacted methyl alcohol; adding sufficient acidic material to said liquid body to obtain a pH of about 5 to about 7; volatilizing unreacted alcohol from said liquid body; and thereafter separating the methyl esters from the glycerine.

7. A process for treating fatty glycerides which comprises reacting a fatty glyceride with ethyl alcohol in the presence of an alkaline alcoholysis catalyst to provide a liquid body containing ethyl esters, glycerine and unreacted ethyl alcohol; adding sufficient acidic material to said liquid body to obtain a pH of about 5 to about 7; volatilizing unreacted alcohol from said liquid body; and thereafter separating the ethyl esters from the glycerine.

8. A process for treating fatty glycerides which comprises reacting a fatty glyceride with a saturated, aliphatic, monohydric alcohol having one to about six carbon atoms per molecule in the presence of an acid alcoholysis catalyst to provide a liquid body containing alkyl esters, glycerine and unreacted alcohol; adding sufficient alkaline material to the said liquid body to give a pH of about 5 to about 7; volatilizing unreacted alcohol from said liquid body; and distilling the remainder of the liquid body under reduced pressure to obtain a distillate comprising alkyl esters and glycerine, whereby said esters and glycerine can be readily separated.

9. A process for treating fatty glycerides which comprises reacting a fatty glyceride with a saturated, straight-chain, monohydric alcohol having one to about six carbon atoms per molecule in the presence of an acid alcoholysis catalyst to provide a liquid body containing alkyl esters, glycerine and unreacted alcohol; adding an amount of alkali to the liquid body insufficient in amount to neutralize said liquid body; thereafter adding an alkaline salt to the said liquid body, said alkaline salt being at least sufficient in amount to complete the neutralization; volatilizing unreacted alcohol from said liquid body; and distilling the remainder of the liquid body under reduced pressure to obtain a distillate comprising alkyl esters and glycerine, whereby said esters and glycerine can be readily separated.

10. A process for treating fatty glycerides which comprises reacting a fatty glyceride with a saturated, straight-chain, monohydric alcohol having one to about six carbon atoms to the molecule in the presence of an acid alcoholysis catalyst to provide a liquid body containing alkyl esters, glycerine and unreacted alcohol; adding an alkali metal soap to the said liquid body, said soap being in excess of the amount required to neutralize said liquid body; volatilizing unreacted alcohol from said liquid body; and distilling the remainder of the liquid body under reduced pressure to obtain a distillate comprising alkyl esters and glycerine, whereby said esters and glycerine can be readily separated.

11. A process for treating fatty glycerides which comprises reacting a fatty glyceride with methyl alcohol in the presence of an acid alcoholysis catalyst to provide a liquid body containing methyl esters, glycerine and unreacted methyl alcohol; adding an alkaline material to said liquid body, said alkaline material being sufficient to remove substantially all of the acid catalyst and insufficient to leave free alkali in the liquid body; volatilizing unreacted alcohol from said liquid body; and thereafter separating the methyl esters from the glycerine.

12. A process for treating fatty glycerides which comprises reacting a fatty glyceride with ethyl alcohol in the presence of an acid alcoholysis catalyst to provide a liquid body containing ethyl esters, glycerine and unreacted ethyl alcohol; adding an alkaline material to said liquid body, said alkaline material being sufficient to remove substantially all of the said catalyst and insufficient to leave free alkali in the liquid body; volatilizing unreacted alcohol from said liquid body; and thereafter separating the ethyl esters from the glycerine.

13. The process which comprises reacting a fatty glyceride with a low molecular weight monohydric alcohol in the presence of an alcoholysis catalyst to provide a liquid body containing esters of fatty acids from said glyceride with said alcohol, unreacted alcohol and partially reacted glycerides; inhibiting the alcoholysis catalyst; volatilizing unreacted alcohol from said liquid body; and distilling the remainder of the liquid body under reduced pressure to obtain a distillate containing partially reacted glycerides.

14. The process which comprises reacting a fatty glyceride with a saturated, aliphatic, monohydric alcohol having one to about six carbon atoms per molecule in the presence of an alcoholysis catalyst to provide a liquid body containing monoglycerides, alkyl esters and unreacted alcohol; substantially neutralizing the said liquid body to a pH of about 5 to about 7; volatilizing unreacted alcohol from said liquid body; and distilling the remainder of the liquid body under a pressure equivalent to about 1 mm. to about 10 mm. of mercury absolute to obtain a distillate containing monoglycerides.

15. The process which comprises reacting a fatty acid ester of an aliphatic polyhydric alcohol with a low molecular weight monohydric alcohol in the presence of an alcoholysis catalyst to provide a liquid body containing esters of fatty acids with said monohydric alcohol and free polyhydric alcohol, removing the influence of the catalyst, volatilizing unreacted monohydric alcohol from said liquid body, and thereafter separating said esters from the polyhydric alcohol.

CLARENCE JOSEPH ARROWSMITH.
JOHN ROSS.